(12) United States Patent
Mohite et al.

(10) Patent No.: US 11,893,788 B2
(45) Date of Patent: Feb. 6, 2024

(54) SYSTEM AND METHOD FOR COMPUTING BURNING INDEX SCORE PERTAINING TO CROPS (71) Applicant: Tata Consultancy Services Limited, Mumbai (IN)

(72) Inventors: Jayantrao Mohite, Thane West (IN); Sanjay Kimbahune, Thane West (IN); Dineshkumar Singh, Thane West (IN); Suryakant Sawant, Thane West (IN); Subhadra Varma Pusapati, Thane West (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 318 days.

(21) Appl. No.: 17/431,134

(22) PCT Filed: Feb. 14, 2020

(86) PCT No.: PCT/IB2020/051233
§ 371 (c)(1),
(2) Date: Aug. 13, 2021

(87) PCT Pub. No.: WO2020/165850
PCT Pub. Date: Aug. 20, 2020

(65) Prior Publication Data
US 2022/0139081 A1 May 5, 2022

(30) Foreign Application Priority Data
Feb. 15, 2019 (IN) .............................. 201921006105

(51) Int. Cl.
G06V 20/10 (2022.01)
G06V 10/20 (2022.01)

(52) U.S. Cl.
CPC .......... *G06V 20/188* (2022.01); *G06V 10/255* (2022.01)

(58) Field of Classification Search
CPC .......................... G06V 20/188; G06V 10/255
See application file for complete search history.

(56) References Cited

U.S. PATENT DOCUMENTS 11,062,223 B2 * 7/2021 Xu .......................... G06Q 10/04
2012/0237083 A1   9/2012 Lange et al.
(Continued)

FOREIGN PATENT DOCUMENTS

| CN | 205582179 | 9/2016 |
| CN | 206557950 | 10/2017 |
| WO | WO2016132161 | 8/2016 |

OTHER PUBLICATIONS

Wang, Shudong et al., "Estimating the area burned by agricultural fires from Landsat 8 Data using the Vegetation Difference Index and Burn Scar Index", International Journal of Wildland Fire 27(4), May 2017, vol. 27(4), Research Gate, https:/www.researchgate.net/publication/324398286_Estimating_the_area_burned_by_agricultural_fires_from_Landsat_8_Data_using_the_Vegetation_Difference_Index_and_Burn_Soar_Index/link/5c9bc307299bf111694bbfd7/download.

(Continued)

*Primary Examiner* — Molly Wilburn
(74) *Attorney, Agent, or Firm* — Finnegan, Henderson, Farabow, Garrett & Dunner, LLP (57) ABSTRACT

Stubble burning is a serious problem resulting in pollution attributable to smog, loss of nutrients in the top soil, and risk of fires spreading out of control. Existing methodologies have attempted to predict burning areas, but have failed to do so because of inefficient sensing mechanism. Present disclosure proposes a system and method to compute burning index score pertaining to crops by detecting harvest (Continued)

season and predicting probable areas of burning by combining current year's crop area map along with harvesting period and historical hot spot information. Computation of the burning index score is accomplished based on inputs received from at least one of satellite imaging, multi-spectral drone based sensing devices and crowdsourcing information. This will help to prioritize the area for taking corrective measures such as training of farmers, availability of resources, optimizing the resources schedule, etc.

15 Claims, 10 Drawing Sheets

(56) References Cited

U.S. PATENT DOCUMENTS

| | | | | |
|---|---|---|---|---|
| 2014/0358486 | A1* | 12/2014 | Osborne | A01G 7/00 702/189 |
| 2017/0161627 | A1* | 6/2017 | Xu | G06Q 10/04 |
| 2019/0303703 | A1* | 10/2019 | Kumar | G06V 10/82 |
| 2020/0193589 | A1* | 6/2020 | Peshlov | G06V 10/955 |
| 2020/0226375 | A1* | 7/2020 | Albrecht | G01J 3/2823 |

OTHER PUBLICATIONS

Kaur, Amandeep et al., "An approach to Detect Stubble Burned Areas in Punjab by Digitally Analyzing Satellite Images", Environmental Science, Aug. 2016, vol. 2, Issue: 6, Journal of Research, http://www.journal4research.org/articles/J4RV216015.pdf.

Preisler, Haiganoush et al., "Probability based models for estimation of wildfire risk", International Journal of Wildland Fire, Jul. 2004, vol. 13, Issue: 2, pp. 133-142, Publisher: U.S. Forest Service, https://www.fs.fed.us/publications/preisler/psw_2004_preisler002_jwf.pdf.

JavierLozan, F. et al., "A multi-scale approach for modelling fire occurrence probability using satellite data and classification trees: A case study in a mountainous Mediterranean region", Remote Sensing of Environment, Apr. 2008, vol. 112, Issue: 3, pp. 708-719 Elsevier, https://susanasuarezseoane.files.wordpress.com/2008/01/rse2-abstract.pdf.

International Search Report and Written Opinion dated Jul. 21, 2020, in International Application No. PCT/IB2020/051233; 7 pages.

* cited by examiner

SYSTEM AND METHOD FOR COMPUTING BURNING INDEX SCORE PERTAINING TO CROPS

CROSS REFERENCE TO RELATED PATENT APPLICATIONS AND PRIORITY

This application is a U.S. national phase application of International Application No. PCT/162020/051233, filed Feb. 14, 2020, which claims priority under 35 U.S.C. § 119 to India Application No. 201921006105, filed on Feb. 15, 2019. The entire contents of the abovementioned applications are incorporated herein by reference.

TECHNICAL FIELD

The disclosure herein generally relates to estimating burning area of crops, and, more particularly, to predict the burning area based on burning index score.

BACKGROUND

Poor air quality is primary cause of various health problems. One of the assignable causes pertaining to poor air quality is crop residue burning. The problem of crop residue burning in prevalent in many parts of the world. Specifically, in some of the Indian states such as Punjab, Haryana and Western part of UP causes air pollution during months after rice and wheat harvesting. This has become a very serious issue all across the world, specifically in northern part of India.

There is an immediate need to predict the probable areas of burning and prioritize the areas to carry out some preventive measures which can reduce the amount of burning. In India, specifically in states of Punjab, Haryana and Western UP, one of the practice followed by the farmers after crop (e.g., wheat and rice) harvesting is burning of the agricultural biomass residue. This not only causes the health hazards but also causes exposure to suspended particulate matter concentration. In agricultural context, residue burning causes loss of nitrogen, phosphorus, sulfur and potassium from the topsoil layer and make the land infertile. There is a long standing technical need to predict, identify and prioritize the areas wherein stubble burning and consequent air pollution may be anticipated.

SUMMARY

Embodiments of the present disclosure present technological improvements as solutions to one or more of the above-mentioned technical problems recognized by the inventors in conventional systems. For example, in one aspect, there is provided a processor implemented method for estimating burning score index. The method comprising obtaining satellite images from one or more satellite sources for a crop to be harvested in an area of interest; generating, for the area of interest, a crop area map using early season satellite time series data derived from the satellite images; extracting for the specific crop, from a Crop Information Database, a Start of the Season (SoS) information pertaining to each of the plurality of pixels comprised in the crop area map using the early season satellite time series data; generating, for a current season, an End of Season (EoS) map based on the SoS information and sensory information associated thereof, wherein the sensory information comprises at least one of temperature, relative humidity and $CO_2$ pertaining to the area of interest; computing for a given time window for the current season, at least a fraction of the area for harvesting the crop (HFa) using the crop area and the EoS map; computing Burnt Fraction Area (BFA) based on based on an average area burned in the given time window (Bw) and average total burnt area (Bt) in the crop area; determining a Burning Index Score (BIS) pertaining to the area of interest where the crop is to be harvested based on HFa and BFA, wherein Burning Index Score (BIS) represents a potential harvesting region associated with burning of the stubble. In an embodiment of the present disclosure the crop area map comprises a plurality of pixels.

In one embodiment, at least a fraction of the area for harvesting the crop may be computed by: computing harvesting area (Hw) for the given time window based on number of pixels in the EoS map and pixel area associated with the number of pixels; and computing total crop area (Ht) based on number of pixels of the crop in the EoS map and the pixel area associated thereof. In one embodiment, an average area burned in the given time window (Bw) may be based on (i) number of burnt pixels for the given time window and associated pixel area and (ii) total number of burnt pixels, comprised in the crop area map. In one embodiment, an average total burnt area (Bt) may be based on (i) total number of burnt pixels and associated pixel area thereof, comprised in the crop area map using a historical burned area data. In one embodiment, the process implement method may further comprise: obtaining, in real time data specific to weather forecast pertaining to the area of interest (ROI), a set of high resolution images of the crop, captured by a multi-spectral drone based sensing device and crowd-sourcing information; and dynamically updating the Burning Index Score (BIS) based on the obtained real time data.

In another aspect, a system for determining Burning Index Score (BIS) is provided. The System comprises a memory storing instructions; one or more communication interfaces and one or more hardware processors coupled to the memory via the one or more communication interfaces. The one or more hardware processors are configured by the instructions to execute: obtain satellite images from one or more satellite sources for a crop to be harvested in an area of interest; generate, for the area of interest, a crop area map using early season satellite time series data derived from the satellite images, wherein the crop area map comprises a plurality of pixels; extract for the specific crop, from a Crop Information Database, a Start of the Season (SoS) information pertaining to each of the plurality of pixels comprised in the crop area map using the early season satellite time series data; generate, for a current season, an End of Season (EoS) map based on the SoS information and sensory information associated thereof, wherein the sensory information comprises at least one of temperature, relative humidity and $CO_2$ pertaining to the area of interest; compute for a given time window for the current season, at least a fraction of the area for harvesting the crop (HFa) using the crop area and the EoS map; compute Burnt Fraction Area (BFA) based on based on an average area burned in the given time window (Bw) and average total burnt area (Bt) in the crop area; determine a Burning Index Score (BIS) pertaining to the area of interest where the crop is to be harvested based on HFa and BFA, wherein Burning Index Score (BIS) represents a potential harvesting region associated with burning of the stubble.

In one embodiment, at least a fraction of the area for harvesting the crop may be computed by: computing harvesting area (Hw) for the given time window based on number of pixels in the EoS map and pixel area associated with the number of pixels; and computing total crop area (Ht) based on number of pixels of the crop in the EoS map and the pixel area associated thereof. In one embodiment, an average area burned in the given time window (Bw) may be based on (i) number of burnt pixels for the given time window and associated pixel area and (ii) total number of burnt pixels, comprised in the crop area map. In one embodiment, an average total burnt area (Bt) may be based on (i) total number of burnt pixels and associated pixel area thereof, comprised in the crop area map using a historical burned area data. In one embodiment, the system may further configured to: obtain, in real time data specific to weather forecast pertaining to the area of interest (ROI), a set of high resolution images of the crop, captured by a multi-spectral drone based sensing device and crowdsourcing information; and dynamically update the Burning Index Score (BIS) based on the obtained real time data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
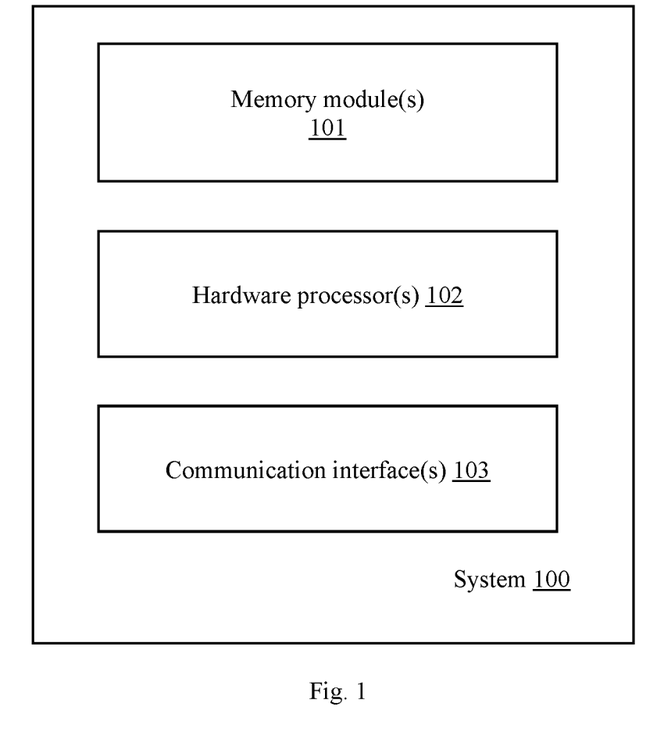
FIG. 1 illustrates a block diagram of a system for predicting burning index score according to an embodiment of the present disclosure.

FIG. 1 illustrates an exemplary block diagram of a system 100 for computing the burning index score in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor (s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

Various organizations have created and populated database related to agriculture from various sources like satellites, agricultural university knowledge. It uses intelligent algorithms to provide meaningful information in usable format The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to one or more entities (e.g., user, machine, and the like). Parameters may comprise sensor data captured through the sensors either connected to the user and/or machine. Further, the database 108 stores information pertaining to inputs fed to the system 100 and/or outputs generated by the system (e.g., at each stage), specific to the methodology described herein.

Figure 2:
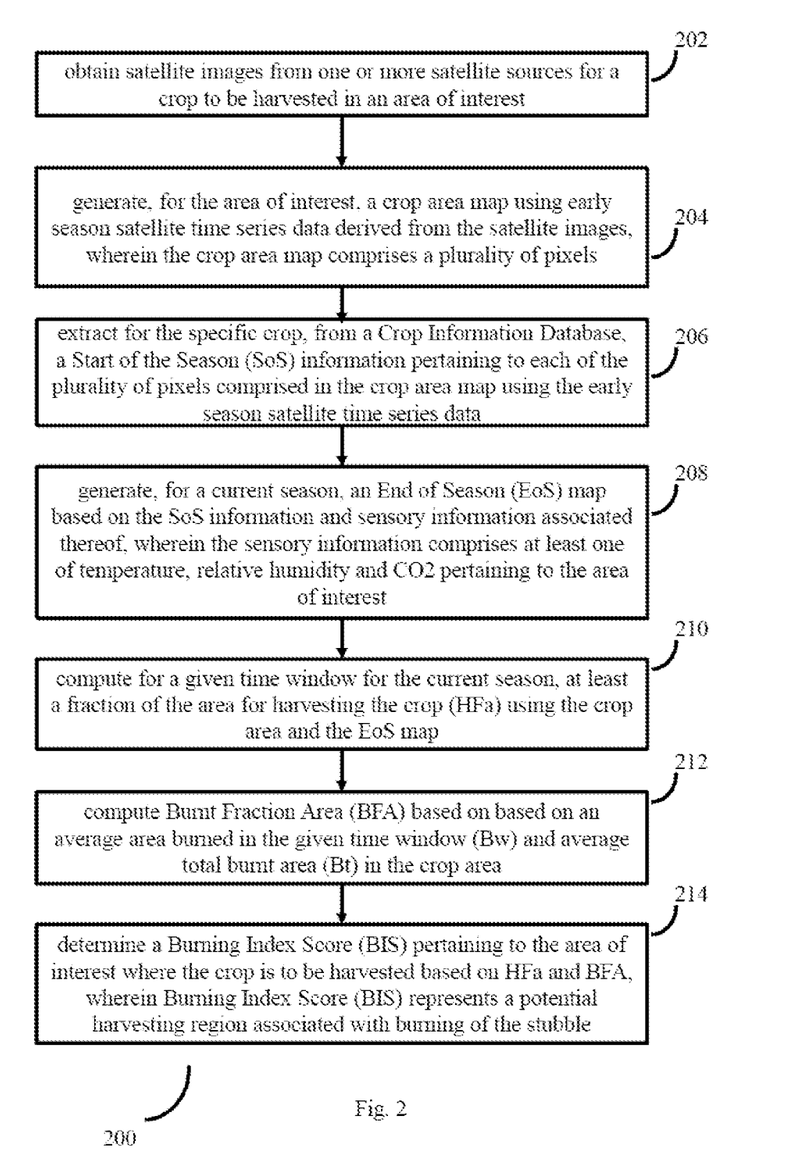
FIG. 2 is a flowchart illustrating the steps involved in predicting burning index score according to an embodiment of the present disclosure.

In operation, a flowchart 200 illustrating a method for predicting the burning probability score is shown in FIG. 2. Initially at Step 202, satellite images from one or more satellite sources for a crop to be harvested in an area of interest are obtained. In an embodiment of the disclosure, said crop can be rice. In another embodiment of the disclosure, said crop can be wheat.

Figure 3:
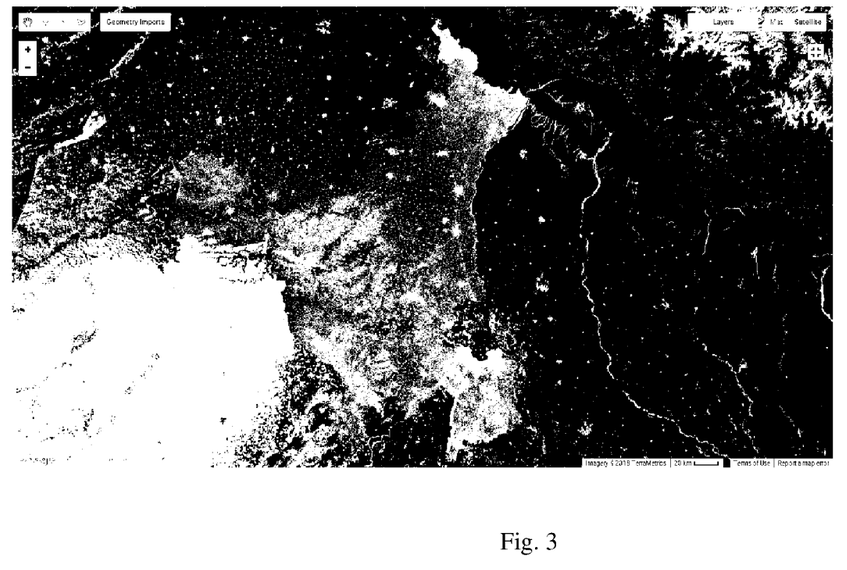
FIG. 3 depicts a crop map according to an embodiment of the present disclosure.

At Step 204, for the area of interest, a crop area map using early season satellite time series data derived from the satellite images, wherein the crop area map comprises a plurality of pixels is generated. To identify pertinent crop area of interest amongst the land area one or more machine learning based classifier such as random forest may be utilized by the system 100. FIG. 3 depicts a crop map obtained through satellite imaging, according to an embodiment of the present disclosure.

Next at Step 206, for the specific crop, a Start of the Season (SoS) information pertaining to each of the plurality of pixels comprised in the crop area map using the early season satellite time series data is extracted from a Crop Information Database. In an embodiment of the disclosure, For instance, for each rice pixel/field, start of the season information may be computed as described below:

Satellite images S1, S2, . . . , St during the transplanting window are obtained. Backscatter values for each pixel and associated date for that satellite image are stored as key-value pair, for example, Sv1-Sd1, Sv2-Sd2, . . . , Svt-Sdt.

Minimum value during transplanting MinV=min(Sv1, Sv2, . . . , Svt)

Date associated with min value SoS is obtained as SoS=Date(MinV)

At Step 208, for a current season, an End of Season (EoS) map is computed/generated based on the SoS information and sensory information associated thereof. In an embodiment, the sensory information comprises at least one of temperature, relative humidity and Carbon di-oxide ($CO_2$) pertaining to the area of interest. For instance, EoS map may be derived as a function SoS information and data from various sensors pertaining to the crop area, wherein the EoS map (or also referred as EoS) may be derived by way of following expression as depicted below:

EoS=$f$(SoS, data from sensors)

Figure 4:
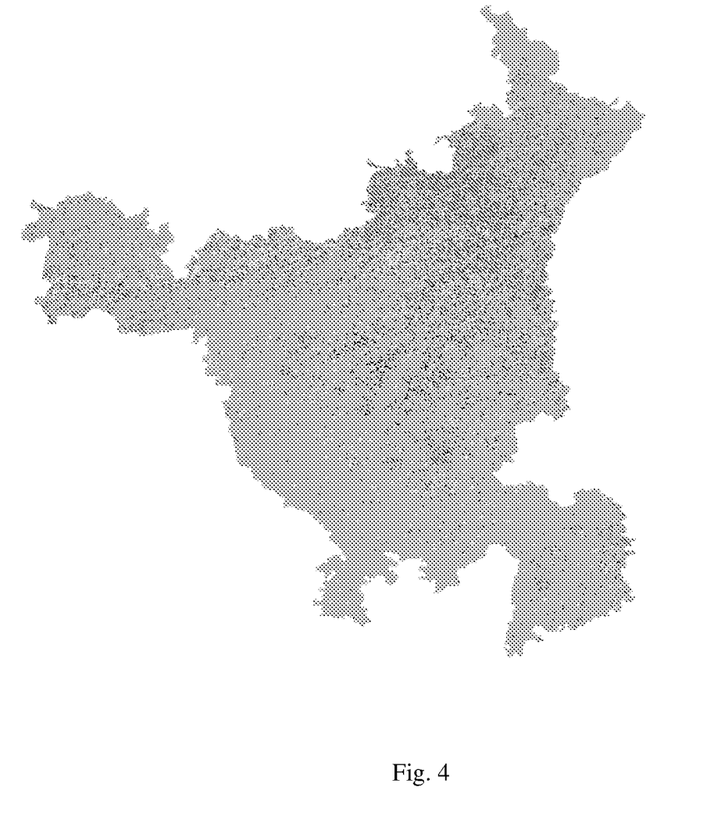
FIG. 4 depicts an End of Season (EoS) crop map according to an embodiment of the present disclosure.

FIG. 4 depicts an End of Season (EoS) crop map according to an embodiment of the present disclosure.

At Step 210, for a given time window for the current season, at least a fraction of the area for harvesting the crop (HFa) is computed using the crop area and the EoS map. For example, for each time window (12 days in this case), the fraction of area to be harvested is computed using total rice area (or total crop area) and EoS Assuming week start DoY is 285 and end DoY is 296

Area to be harvested in a time window, (Hw)=No of pixels in EoS with value between 285 to 296*Pixel area. In another words, harvesting area (Hw) for the given time window is computed based on number of pixels in the EoS map and pixel area associated with the number of pixels.

Further total crop area (Ht) is computed based on number of pixels of the crop in the EoS map and the pixel area associated thereof. Total crop area (in this case total rice area) may be computed and expressed by way of following equation:

Total Crop Area $Ht$=Total no of crop pixels*Pixel area

Based on the area to be harvested (Hw) and the total crop area (Ht), the fraction area to be harvested is computed by way of following expression:

Fraction area to be harvested, $HFa=Hw/Ht$

Figure 5:
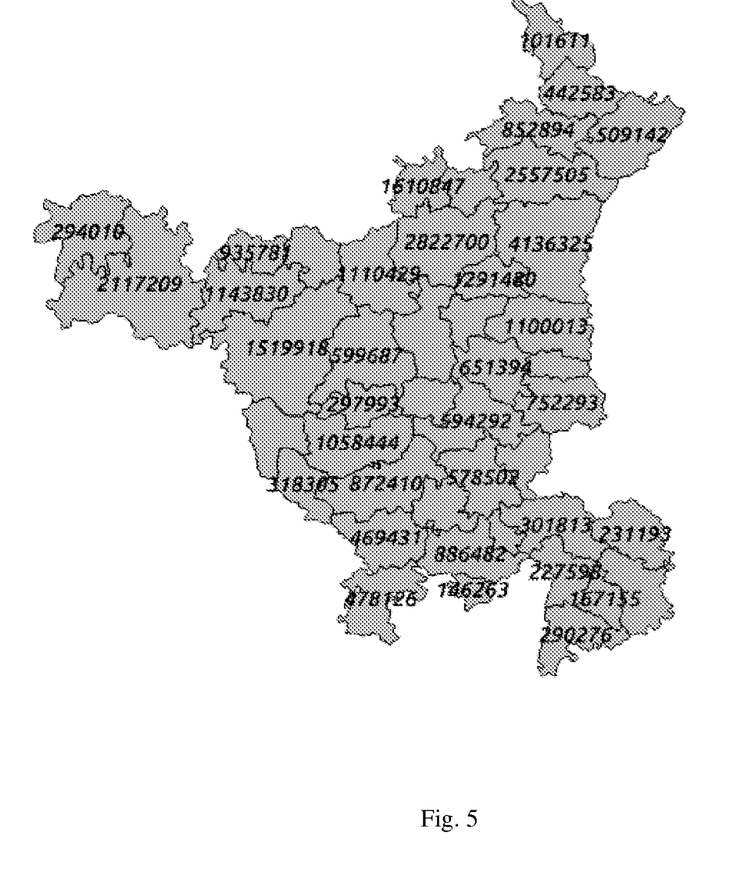
FIG. 5 depicts harvest area where the day of the year is the range 285 days to 296 according to an embodiment of the present disclosure.

Sample value of HFa in an embodiment of the disclosure is 0.2. In other words, in an embodiment of the disclosure at least a fraction of the area for harvesting the crop is determined by computing harvesting area (Hw) for the given time window based on number of pixels in the EoS map and pixel area associated with the number of pixels; and computing total crop area (Ht) based on number of pixels of the crop in the EoS map and the pixel area associated thereof. Referring now to FIG. 5, a Region of Interest (RoI) marked with the numerical "294010" indicates a probable harvest area in hectares pertaining to a crop during day of the year, DoY 285 to 296. In one embodiment, the Region of Interest (RoI) may indicate a Taluka or a district in a State. It may also designate a logical governance unit.

Figure 6:
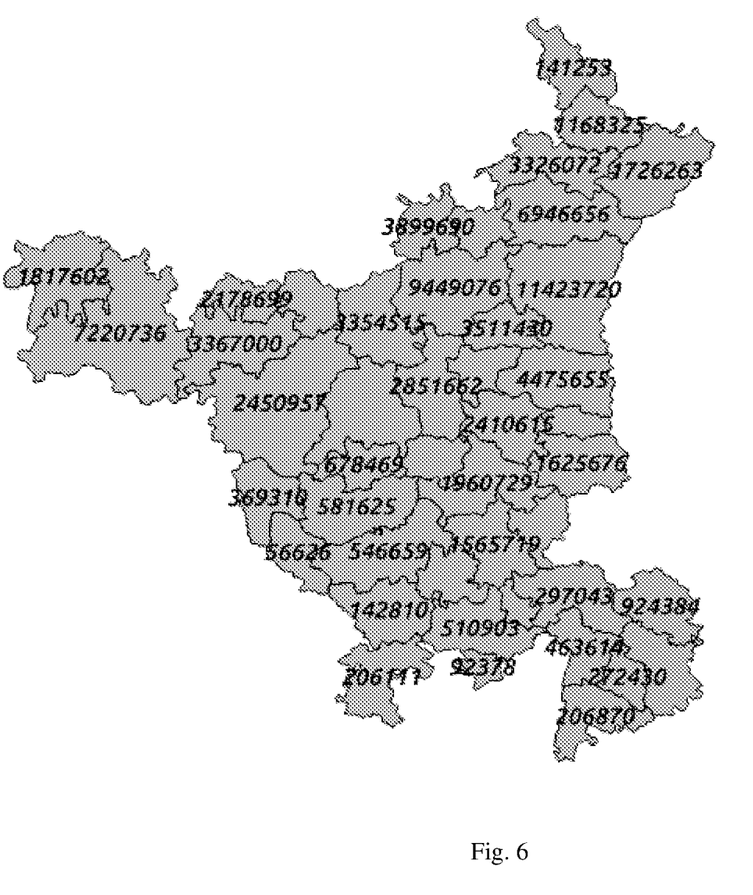
FIG. 6 depicts total harvest area pertaining to a crop, according to an embodiment of the present disclosure.

Referring now to FIG. 6, a Region of Interest (RoI) marked with the numerical "1817602" indicates total harvest area in hectares pertaining to a crop during day of the year, DoY 285 to 296. In one embodiment, the Region of Interest (RoI) may indicate a taluka or a district in a State.

Figure 7:
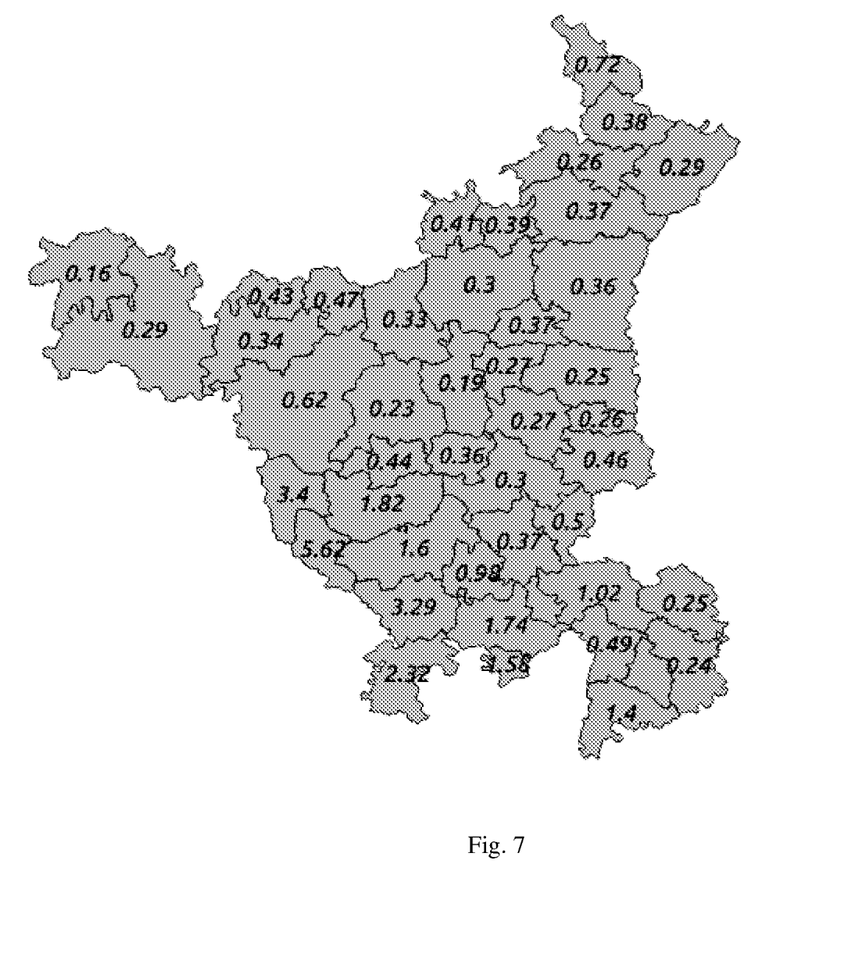
FIG. 7 depicts percent crop area harvested, according to an embodiment of the present disclosure.

Referring now to FIG. 7, a Region of Interest (RoI) marked with the numerical "0.16" indicates percent harvest area in hectares pertaining to a crop during day of the year, DoY 285 to 296. In the instant example, percent harvest area is computed as a ratio of harvest area to the total harvest area 0.16=294010/1817602

Figure 8:
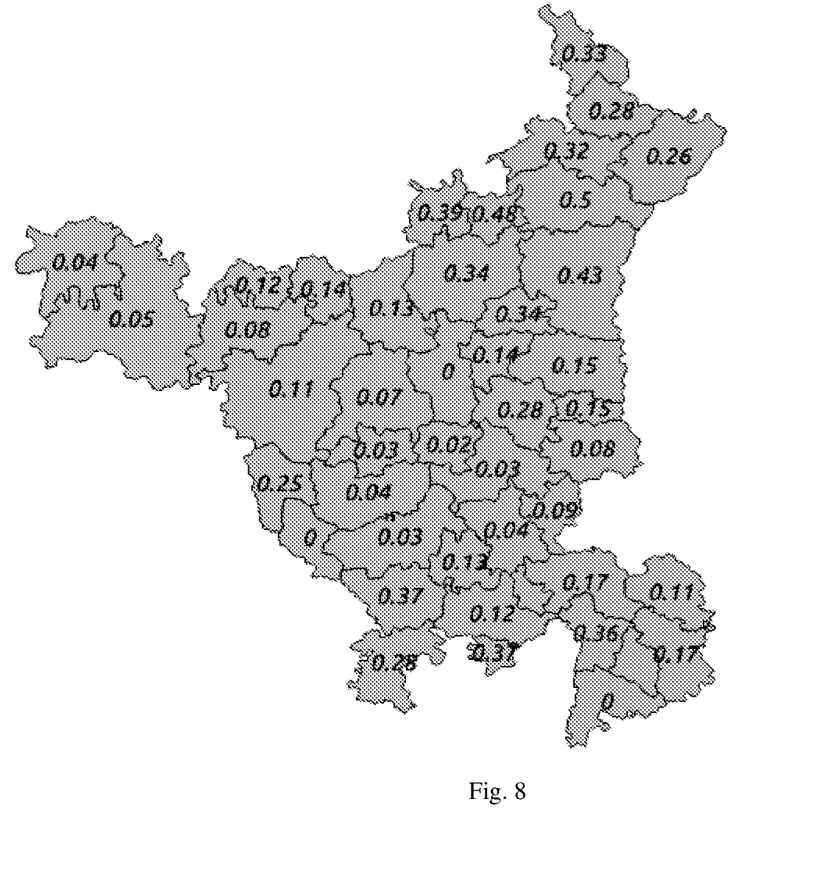
FIG. 8 depicts percentage area burnt, according to an embodiment of the present disclosure.

In an embodiment of the disclosure an average area burned in the given time window (Bw) is computed based on (i) number of burnt pixels for the given time window and associated pixel area and (ii) total number of burnt pixels, comprised in the crop area map. Further, average total burnt area (Bt) is based on (i) total number of burnt pixels and associated pixel area thereof, comprised in the crop area map using a historical burned area data. Referring now to FIG. 8, a Region of Interest (RoI) marked with the numerical "0.04" indicates percentage area burnt pertaining to a crop during day of the year, DoY 285 to 296. This is estimated from average area burnt in last few years during DoY 285 to 296 in said taluka or associated governance unit thereof and average total area burnt in said taluka or associated governance unit thereof.

At Step 214, a Burning Index Score (BIS) pertaining to the area of interest where the crop is to be harvested based on HFa and BFA, wherein Burning Index Score (BIS) represents a potential harvesting region associated with burning of the stubble is determined.

Figure 9:
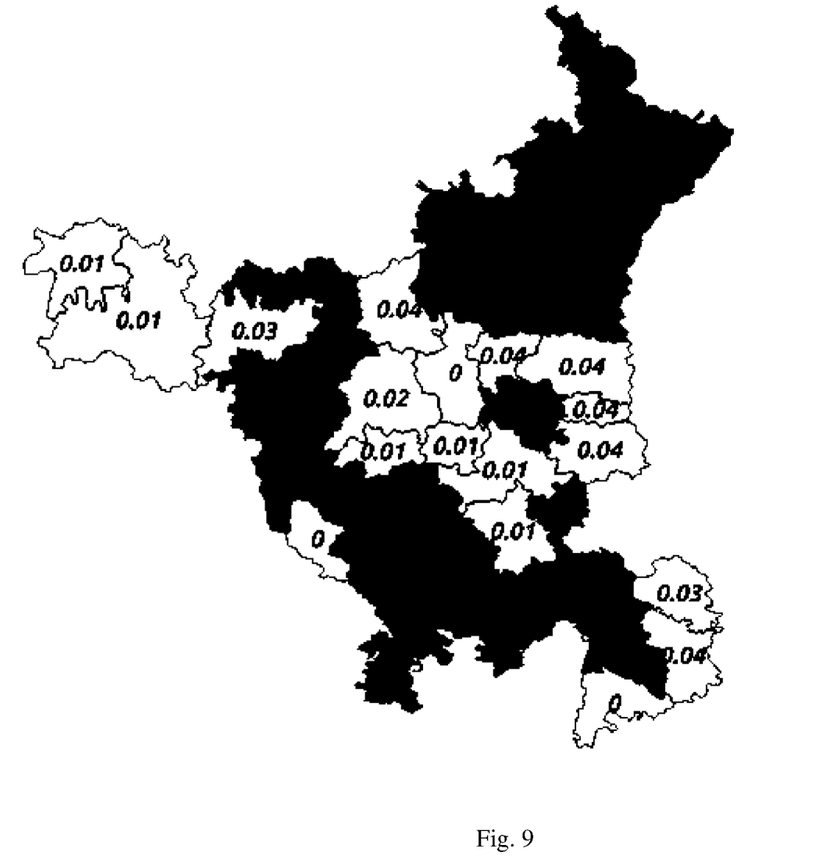
FIG. 9 depicts burning score index, according to an embodiment of the present disclosure.

Referring now to FIG. 9, a Region of Interest (RoI) marked with the numerical "0.01" indicates burning index score pertaining to a crop during day of the year, DoY 285 to 296 based on percent area harvested and percent area burnt during DoY 285-296 for said taluka or associated governance unit thereof.

Figure 10:
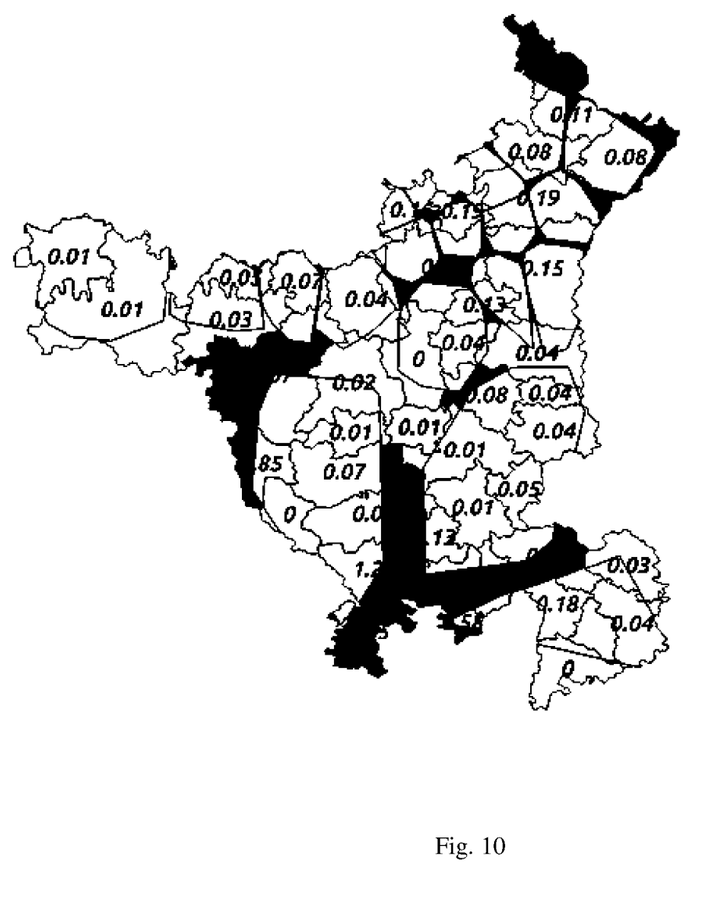
FIG. 10 depicts burning score index convex, according to an embodiment of the present disclosure.

Referring now to FIG. 10, a Region of Interest (RoI) marked with the numerical "0.01" indicates burning index score convex pertaining to a crop during day of the year, DoY 285 to 296 based on percent area harvested and percent area burnt during DoY 285-296 for said taluka or associated governance unit thereof.

For instance, burned area in each cluster (taluka/village) for last 10 years from MODIS burned area product/VIIRS are first obtained. Moderate Resolution Imaging Spectroradiometer (MODIS) and Visible Infrared Imaging Radiometer Suite (VIIRS) are the satellites/sensors which can be used to derive burnt area.

Assuming week start DoY is 285 and end DoY is 296

Average Area burned in a time window, $(Bw)$=Average No of burnt pixels between DoY 285 to 296*Pixel area Average Total Burnt Area $Bt$=Total no of burnt pixels*Pixel area/Total no of years Burnt fraction area $BFa=Bw/Bt$ Burning Index Score=$HFa*Bfa$ In the present disclosure, Burning Index Score is computed as described below by way of example:

Average area burned in the given time window (Bw) is 2500 Hectre area (Ha) and

Average total burnt area (Bt) is 20000 Ha

Burnt Fraction Area=$BFa=Bw/Bt=2500/20000=0.125$

Burning Index Score=$Hw*Bfa=0.2*0.125=0.025$

The burning index score is computed as a product of HFa and BFa.

In an embodiment of the disclosure, real time data specific to weather forecast pertaining to the area of interest (ROI), a set of high resolution images of the crop, captured by a multi-spectral drone based sensing device and crowdsourcing information is obtained. Further, the Burning Index Score (BIS) based on the obtained real time data is dynamically updated. Further, multi-spectral camera with 8 bands covering Visible, Near Infrared (NIR) and Shortwave Infrared (SWIR) sensors are used in certain implementations. The information in NIR and SWIR bands is deployed to get accurate insights on harvested areas and/or burned areas so as to update the burning index score. Specifically in areas where there is a high probability of burning and low confidence on the burning index score, the data obtained through multi-spectral camera can be augmented with satellite based scores to obtain a higher degree of precision.

Crowdsourcing information can comprise data specific to geo tagged information, for example, images of the crop, incidence of burning, surrounding ambient and any other data that affects crop harvesting. In one embodiment, images of the crop, may further include latitude and longitude information of field where incidence of burning is taking place. This information may be further utilized for updating the burning index score by performing the steps 212 through 214. In certain scenarios, to compute updated burning index score in real time, the system may rely upon (i) information retrieved from, and captured by the multi-spectral drone based sensing device (ii) output of Steps 202 till 210, and (iii) sensory information obtained from sensors deployed in region of interest.

Present disclosure proposes a system and method to detect the harvest season, predict the probable areas of burning by combining the current year's crop area map along with harvesting period and historical hot spot information. This will help to prioritize the area for taking corrective measures such as training of farmers, availability of resources, providing information on appropriate government schemes, optimizing the resources schedule, etc.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor implemented method, comprising:
obtaining satellite images from one or more satellite sources for a crop to be harvested in an area of interest (202);
generating, for the area of interest, a crop area map using early season satellite time series data derived from the satellite images, wherein the crop area map comprises a plurality of pixels (204);
extracting for the specific crop, from a Crop Information Database, a Start of the Season (SoS) information pertaining to each of the plurality of pixels comprised in the crop area map using the early season satellite time series data (206);
generating, for a current season, an End of Season (EoS) map based on the SoS information and sensory information associated thereof, wherein the sensory information comprises at least one of temperature, relative humidity and CO2 pertaining to the area of interest (208);
computing for a given time window for the current season, at least a fraction of the area for harvesting the crop (HFa) using the crop area and the EoS map (210);
computing Burnt Fraction Area (BFA) based on an average area burned in the given time window (Bw) and average total burnt area (Bt) in the crop area (212);
determining a Burning Index Score (BIS) pertaining to the area of interest where the crop is to be harvested based on HFa and BFA, wherein Burning Index Score (BIS) represents a potential harvesting region associated with burning of stubble (214).

2. The processor implemented method of claim 1, wherein the at least a fraction of the area for harvesting the crop is computed by:

computing harvesting area (Hw) for the given time window based on number of pixels in the EoS map and pixel area associated with the number of pixels; and computing a total crop area (Ht) based on number of pixels of the crop in the EoS map and the pixel area associated thereof.

3. The processor implemented method of claim 1, wherein an average area burned in the given time window (Bw) is based on (i) number of burnt pixels for the given time window and associated pixel area and (ii) total number of burnt pixels, comprised in the crop area map.

4. The processor implemented method of claim 1, wherein average total burnt area (Bt) is based on (i) total number of burnt pixels and associated pixel area thereof, comprised in the crop area map using a historical burned area data.

5. The processor implemented method of claim 1, further comprising;
obtaining, in real time data specific to weather forecast pertaining to the area of interest (ROI), a set of high resolution images of the crop, captured by a multi-spectral drone based sensing device and crowdsourcing information; and
dynamically updating the Burning Index Score (BIS) based on the obtained real time data.

6. A system (100) for determining Burning Index Score (BIS), comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to execute:
obtain satellite images from one or more satellite sources for a crop to be harvested in an area of interest;
generate, for the area of interest, a crop area map using early season satellite time series data derived from the satellite images, wherein the crop area map comprises a plurality of pixels;
extract for the specific crop, from a Crop Information Database, a Start of the Season (SoS) information pertaining to each of the plurality of pixels comprised in the crop area map using the early season satellite time series data;
generate, for a current season, an End of Season (EoS) map based on the SoS information and sensory information associated thereof, wherein the sensory information comprises at least one of temperature, relative humidity and CO2 pertaining to the area of interest;
compute for a given time window for the current season, at least a fraction of the area for harvesting the crop (HFa) using the crop area and the EoS map;
compute Burnt Fraction Area (BFA) based on based on an average area burned in the given time window (Bw) and average total burnt area (Bt) in the crop area;
determine a Burning Index Score (BIS) pertaining to the area of interest where the crop is to be harvested based on HFa and BFA, wherein Burning Index Score (BIS) represents a potential harvesting region associated with burning of stubble.

7. The system of claim 6, wherein the at least a fraction of the area for harvesting the crop is computer by:
computing harvesting area (Hw) for the given time window based on number of pixels in the EoS map and pixel area associated with the number of pixels; and computing total crop area (Ht) based on number of pixels of the crop in the EoS map and the pixel area associated thereof.

8. The system of claim 6, wherein an average area burned in the given time window (Bw) is based on (i) number of burnt pixels for the given time window and associated pixel area and (ii) total number of burnt pixels, comprised in the crop area map.

9. The system of claim 6, wherein average total burnt area (Bt) is based on (i) total number of burnt pixels and associated pixel area thereof, comprised in the crop area map using a historical burned area data.

10. The system of claim 6, further comprising;
obtaining, in real time data specific to weather forecast pertaining to the area of interest (ROI), a set of high resolution images of the crop, captured by a multi-spectral drone based sensing device and crowdsourcing information;
dynamically updating the Burning Index Score (BIS) based on the obtained real time data.

11. One or more non-transitory machine readable information storage mediums comprising one or more instructions which when executed by one or more hardware processors cause:
obtaining satellite images from one or more satellite sources for a crop to be harvested in an area of interest (202);
generating, for the area of interest, a crop area map using early season satellite time series data derived from the satellite images, wherein the crop area map comprises a plurality of pixels (204);
extracting for the specific crop, from a Crop Information Database, a Start of the Season (SoS) information pertaining to each of the plurality of pixels comprised in the crop area map using the early season satellite time series data (206);
generating, for a current season, an End of Season (EoS) map based on the SoS information and sensory information associated thereof, wherein the sensory information comprises at least one of temperature, relative humidity and CO2 pertaining to the area of interest (208);
computing for a given time window for the current season, at least a fraction of the area for harvesting the crop (HFa) using the crop area and the EoS map (210);
computing Burnt Fraction Area (BFA) based on an average area burned in the given time window (Bw) and average total burnt area (Bt) in the crop area (212);
determining a Burning Index Score (BIS) pertaining to the area of interest where the crop is to be harvested based on HFa and BFA, wherein Burning Index Score (BIS) represents a potential harvesting region associated with burning of stubble (214).

12. The one or more non-transitory machine readable information storage mediums of claim 11, wherein at least a fraction of the area for harvesting the crop is computed by:
computing harvesting area (Hw) for the given time window based on number of pixels in the EoS map and pixel area associated with the number of pixels; and
computing total crop area (Ht) based on number of pixels of the crop in the EoS map and the pixel area associated thereat.

13. The one or more non-transitory machine readable information storage mediums of claim 11, wherein an average area burned in the given time window (Bw) is based on (i) number of burnt pixels for the given time window and associated pixel area and (ii) total number of burnt pixels, comprised in the crop area map.

14. The one or more non-transitory machine readable information storage mediums of claim 11, wherein average total burnt area (Bt) is based on (i) total number of burnt pixels and associated pixel area thereof, comprised in the crop area map using a historical burned area data.

15. The one or more non-transitory machine readable information storage mediums of claim 11, further comprising;
    obtaining, in real time data specific to weather forecast pertaining to the area of interest (ROI), a set of high resolution images of the crop, captured by a multi-spectral drone based sensing device and crowdsourcing information; and
    dynamically updating the Burning Index Score (BIS) based on the obtained real time data.

* * * * *